Sept. 10, 1957 H. F. KENNISON 2,805,683
PIPE AND METHOD FOR MAKING THE SAME
Filed Feb. 17, 1950 2 Sheets-Sheet 2
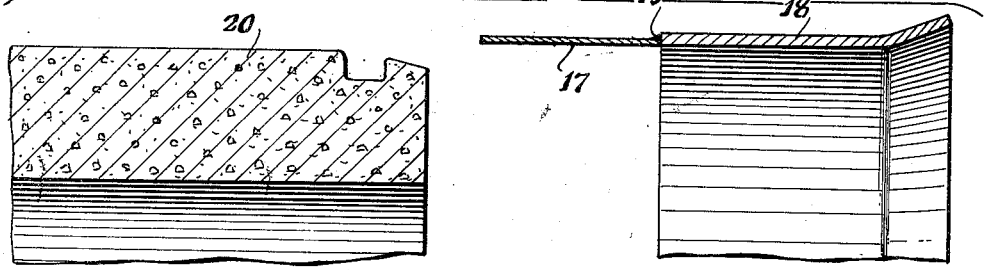
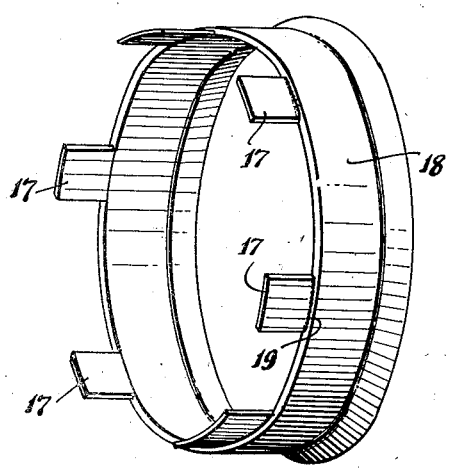
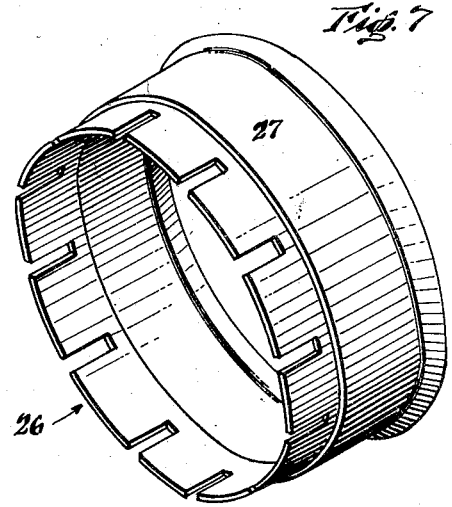
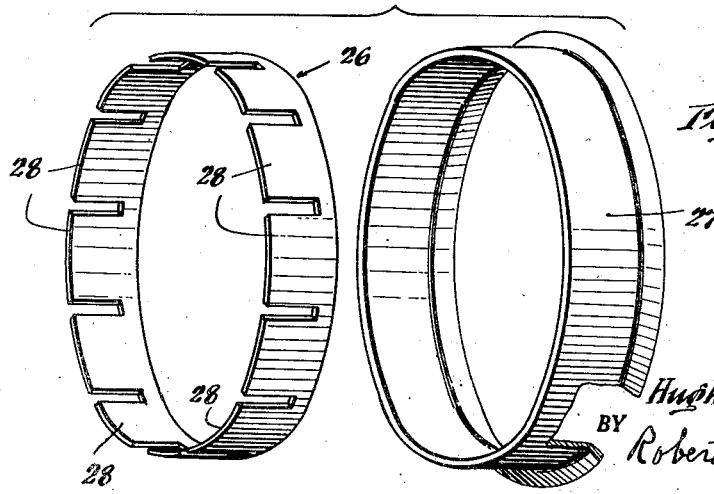
INVENTOR.
Hugh F. Kennison
BY Robert S. Dunham
ATTORNEY United States Patent Office 2,805,683
Patented Sept. 10, 1957

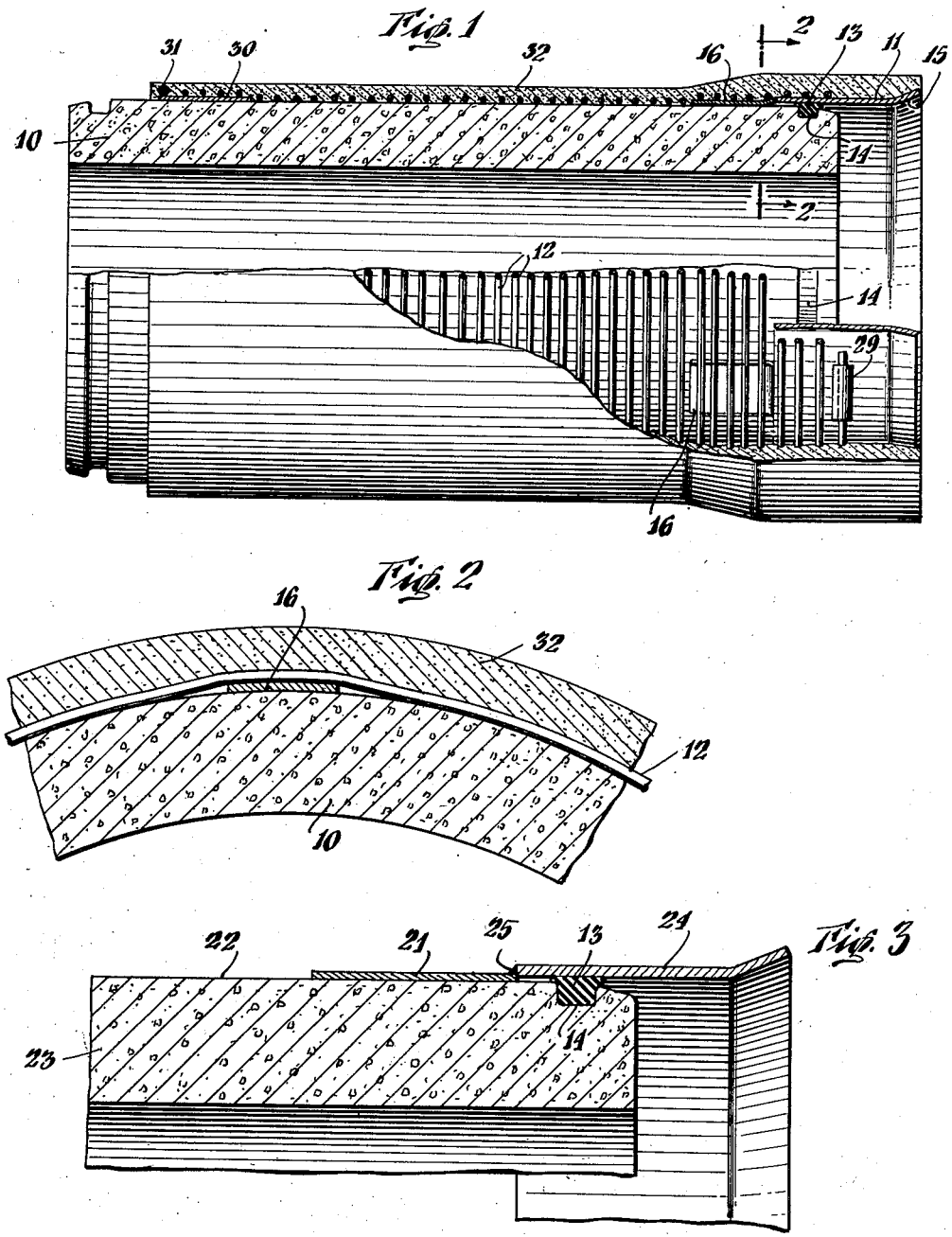

2,805,683

PIPE AND METHOD FOR MAKING THE SAME

Hugh F. Kennison, Verona, N. J., assignor to Lock Joint Pipe Company, East Orange, N. J., a corporation of New Jersey Application February 17, 1950, Serial No. 144,661

5 Claims. (Cl. 138—25)

This invention relates to prestressed concrete pipe sections and particularly to a composite wire-wound pipe section comprising a conduit and a bell ring which are so rigid that for assembling the two pieces in fixed relationship some additional structural device is required.

The pipe section comprises a moulded conduit, a steel bell ring which provides a socket for the pipe section, relatively flexible means attached to the bell ring and overlying the exterior of the conduit, sealing means between the conduit and the bell ring, and a tensioned wire wound over the conduit and the flexible means and pressing the flexible means against the exterior surface of the conduit and thereby firmly securing the bell ring in a fixed position on the conduit. The tensioned wire is attached to the pipe section and provides permanent reinforcing for the conduit. The flexible means may consist of one or more strips of metal of greater flexibility than the bell ring. They may be attached to the bell ring either before or after the bell ring has been placed in its intended position over an end of the conduit.

The invention is principally concerned with the fabrication of a composite pipe section of which the conduit consists of moulded concrete and the bell ring is fashioned from steel. In this type of pipe the conduit and the bell ring can be individually formed and completed with desired dimensions but the materials and their shapes are so rigid as to present a problem for adequately joining them to form a bell. It is an object of the invention to provide a dependable manner for firmly securing the two pieces together in fixed relationship.

Various ways of employing the principle of the invention are illustrated in the accompanying drawing, in which:

Fig. 1 illustrates a pipe section embodying the principle of the invention, with parts broken away;

Fig. 2 is a section on line 2—2 of Fig. 1;

Fig. 3 is an enlarged view illustrating the stage of construction at which a flexible member is attached to a bell ring after the bell ring is mounted on the end of a conduit;

Fig. 4 is illustrative of the stage of construction in which a flexible member is attached to the bell ring before the bell ring is assembled to the conduit;

Fig. 5 illustrates a detached bell ring with several individual flexible members attached thereto;

Fig. 6 illustrates a bell ring and a rolled flexible member separate from one another; and Fig. 7 illustrates a detached bell ring and the flexible member of Fig. 6 in assembled relationship.

The pipe section illustrated in Fig. 1 is a finished product including a moulded conduit 10, a steel bell ring 11 which extends from the conduit and provides a bell for forming a joint socket, and tensioned wire 12 wrapped around the conduit. An advantage of this type of pipe section lies in the fact that the respective conduit and bell ring can be manufactured in quantities and assembled only as needed. The bell ring is a closed ring which is expanded or forged to the correct proportions for fitting over the end of the conduit. The conduit is made from concrete or from other mouldable material which may be fashioned in any manner desired and provided with suitable caulking or sealing surfaces. The finished conduit is produceable in one casting operation.

The bell ring is mounted over an end of the conduit. The inner diameter of the bell ring must clear the outer surface of the conduit for practical purposes and in order to facilitate their assembly. Although the amount of clearance between the bell ring and the conduit is quite small and constitutes only a minimum annular space, the presence of the space and the unyielding character of the bell ring and of the conduit inhibits a seizing relationship between the two members.

A form of seal between the conduit and the bell ring which has been found to be satisfactory is illustrated in the drawing. This seal consists of a gasket 13 of rubber or of rubber-like material compressed within an annular groove 14 on the exterior of the conduit, but other forms of sealing means may be employed, if desired. Before mounting the gasket the bell ring is slid over the conduit to a position rearward of the groove. The gasket is then placed in the groove and the bell ring is drawn forwardly over the gasket. As this action proceeds the sloping end 15 of the bell ring compresses the gasket within the confines of the groove and of the inner surface of the ring. The bell ring is advanced to a position in which it serves as a joint socket for the pipe section, as shown in Fig. 1.

While the pressure on the gasket is sufficient temporarily to hold the ring in place, it is desirable to provide a more permanent and rigid connection between the ring and the conduit. This cannot be done directly because of the absence of any anchoring medium inherently a part of the conduit. In the present pipe section no structure is used which is physically associated with the conduit during the forming of the same. The conduit has an all-concrete exterior surface and it is more economical to manufacture than a conduit having auxiliary means embedded therein to assist in permanently securing the bell ring in place.

The wall of the concrete conduit of the pipe section of the present invention is subjected to compressional stress by the tensioned wire winding 12. The wire winding may be applied by the use of a machine of the type described in the United States Patent No. 2,348,765. The wire winding is applied to the conduit by rotating the same as the wire is fed thereto under tension and is guided to come onto the conduit in spaced convolutions. The ends of the wire, and sometimes intermediate portions, are secured to the pipe section by the use of fastening devices of one form or another.

In accordance with the present invention flexible metallic means are provided for use in attaching the bell ring to the conduit. The flexible means are secured to the bell ring in such positions as to extend rearwardly thereof and over the exterior surface of the conduit. The flexible metallic means may take the form of a plurality of steel strips or plates 16 which are more flexible than the steel of the bell ring. These strips are preferably conformed to the cylindrical surface of the conduit. It is convenient to apply the flexible means by attaching a number of flexible strips 17 (Figs. 4 and 5) to a bell ring 18 by welded connections 19 before the bell ring is assembled to the conduit 20. If desired, similar strips 21 (Fig. 3) may be placed in contact with the exterior surface 22 of a conduit 23 and contiguous to the rear edge of a bell ring 24 to which they are welded, as at 25. Satisfactory results have been obtained by the use of six equally spaced strips, but for pipe sections of lesser diameter their number may be reduced.

In Figs. 6 and 7, there is illustrated a single strip or band 26 of flexible steel which has been rolled to an inner diameter substantially equal to the inner diameter of the bell ring 27. This band is at least of sufficient length to extend circumferentially around the greater portion of the circumference of the moulded conduit. Its rear edge is notched to provide fingers 28 which are adapted to be pressed individually into contact with the exterior of a moulded conduit by a tensioned wire winding. This band may be welded to the bell ring, as illustrated in Fig. 7, before the bell ring is applied over the end of a conduit, or attached to the bell ring after the band and the bell ring have been mounted in place on the conduit.

When the wire winding is applied about the conduit it is carried over the flexible members, and due to the high tension in the wire, the flexible members are flexed and forcibly pressed against the exterior of the conduit, with the result that the bell ring is firmly attached to the conduit.

The end of the wire at the bell end of the pipe may be attached to one of these flexible members, or to the bell ring, as desired.

As illustrated in Fig. 1, the end of the wire passes through a sleeve 29 which is seized over the wire and is, in turn, welded to the bell ring. Any other suitable form of anchor may be used. The end of the wire at the spigot end of the pipe may be similarly attached to a plate 30 by an anchor or connector 31. The plate 30 underlies the wire winding and would be loose except for the pressure exerted thereon by the wire and its frictional engagement with the exterior surface of the conduit. It is indifferent as to where the ends of the wire winding are secured to the pipe section so long as the winding is permanently held in place under tension. In order to protect the wire winding a coating of cement 32 is usually applied to the exterior of the pipe section.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. A composite wire wound pipe section comprising a prefabricated moulded conduit helically wrapped with a tensioned wire winding and a steel ring fitted over one end of the conduit and projecting therefrom to form a joint socket, the inner surface of said ring overlapping said conduit being slightly spaced from the outer surface of said conduit, sealing means between said conduit and said ring, and means for securing said ring to said conduit, said securing means comprising a plurality of separated strips of steel circumferentially spaced around and lying in contact with the exterior of said moulded conduit and individually held in a fixed position thereagainst by said tensioned wire winding, said strips of steel being more flexible than said steel ring, and welded connections between said strips and said ring, whereby the moulded conduit and the steel ring are immovably held together.

2. A bell-ended pipe section comprising a prefabricated conduit of hardened concrete, a rigid unyielding annular bell member partly overlapping one end of said conduit and projecting therefrom to provide a joint socket, the inner surface of the bore of said bell member adjacent the end thereof overlapping said conduit being substantially parallel to and spaced from the outer surface of said conduit and thereby providing a clearance between the overlapping surfaces, an annular gasket seated within a circumferential groove in the outer surface of said conduit and contained therein by the overlapping inner surface of said bore for sealing said clearance against the flow of fluid between said conduit and said bell member, and means securing said bell member immovably on said conduit, said securing means comprising a strip of metal extending rearwardly of said bell member and overlying a circumferentially restricted area of the outer surface of said conduit, said strip of metal having more flexibility than said bell member, means attaching said strip of metal to said bell member, and a tensioned wire helically wrapped around said conduit, over said strip and forcibly pressing said strip into frictional engagement with the exterior surface of said conduit whereby said bell member is immovably secured to said conduit.

3. A bell-ended pipe section comprising a prefabricated conduit of hardened concrete, a rigid unyielding annular bell member partly overlapping one end of said conduit and projecting therefrom to provide a joint socket, said bell member having its inner surface spaced from the outer surface of said conduit whereby a clearance is provided between said bell member and the outer surface of said conduit, an annular gasket seated within a circumferential groove in the outer surface of said conduit and contained therein by said bell member for sealing said clearance against the flow of fluid between said conduit and said bell member, and means securing said bell member immovably on said conduit, said securing means comprising a strip of metal having greater flexibility than said bell member, said strip extending circumferentially around a greater portion of the circumference of said conduit and having axially extending fingers separated by notches, means attaching said strip to said bell member, and a tensioned wire helically wrapped around said conduit, over said strip and flexing said fingers into frictional engagement with the exterior surface of said conduit whereby said bell member is immovably secured to said conduit.

4. In a method for making a composite pipe section having a rigid conduit and a steel bell ring mounted over one end thereof and extending forwardly to provide a socket for the pipe section, the steps comprising attaching a plurality of flexible members to the rear edge of a bell ring with the strips extending in a direction in continuation of the bell ring, mounting said bell ring over the end of a conduit in overlapping relationship therewith to provide a joint socket at the end of the pipe section and with said attached members extending over the outer surface of said conduit, and securing said bell ring to said conduit by wrapping and securing a tensioned wire about the conduit and over the flexible members and thereby compressing the flexible members into frictional contact with the exterior of the conduit.

5. In a method for making a bell-ended pipe section, the steps comprising moulding a concrete conduit, after said conduit has hardened, placing a rigid annular bell member in overlapping relationship with one end of the conduit and thereby confining a gasket within a circumferential groove in the outer surface of the conduit, attaching to said bell member a strip of metal having greater flexibility than the bell member, and permanently attaching said bell member to said conduit by winding and fastening a tensioned wire about said conduit and over said strip, thereby pressing said strip into frictional engagement with the exterior of said conduit.

References Cited in the file of this patent

UNITED STATES PATENTS

| 1,910,642 | Sherrard | May 23, 1933 |
| 1,958,872 | Ukropina | May 15, 1934 |
| 2,138,946 | Trickey | Dec. 6, 1938 |
| 2,234,643 | Grant | Mar. 11, 1941 |
| 2,270,296 | Henning | Jan. 20, 1942 |
| 2,348,477 | Jenkins | May 9, 1944 |
| 2,371,107 | Mapes | Mar. 6, 1945 |
| 2,639,731 | Whiting | May 26, 1953 |
| 2,662,555 | Hirsh | Dec. 15, 1953 |

FOREIGN PATENTS

| 837,937 | France | Feb. 23, 1939 |
| 213,654 | Switzerland | May 16, 1941 |